US009304839B2

(12) United States Patent
Hsu et al.

(10) Patent No.: US 9,304,839 B2
(45) Date of Patent: Apr. 5, 2016

(54) RESENDING MESSAGES

(71) Applicant: Hewlett-Packard Development Company, L.P., Houston, TX (US)

(72) Inventors: Meichun Hsu, Los Altos Hills, CA (US); Qiming Chen, Cupertino, CA (US); Maria Guadalupe Castellanos, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 200 days.

(21) Appl. No.: 13/873,889

(22) Filed: Apr. 30, 2013

(65) Prior Publication Data

US 2014/0325527 A1    Oct. 30, 2014

(51) Int. Cl.
*G06F 9/54* (2006.01)
(52) U.S. Cl.
CPC .......... *G06F 9/546* (2013.01); *G06F 2209/546* (2013.01)
(58) Field of Classification Search
CPC ......................... G06F 9/546; G06F 2209/546
See application file for complete search history.

(56) References Cited

U.S. PATENT DOCUMENTS

| 6,012,094 | A | 1/2000 | Leymann et al. |
| 7,206,805 | B1 | 4/2007 | McLaughlin |
| 2002/0021700 | A1* | 2/2002 | Hata ...................... H04L 1/1628 370/395.42 |
| 2003/0066016 | A1* | 4/2003 | Wehage ................ H04L 1/0061 714/781 |
| 2007/0223526 | A1* | 9/2007 | Jiang ............................. 370/468 |
| 2008/0209300 | A1* | 8/2008 | Fukushima ........... H04L 1/1642 714/748 |
| 2008/0250110 | A1* | 10/2008 | Zhao ........................ G06F 9/546 709/206 |
| 2010/0074255 | A1* | 3/2010 | Harpaz et al. ................. 370/390 |
| 2011/0067035 | A1* | 3/2011 | Jiang et al. .................... 719/313 |
| 2014/0040898 | A1* | 2/2014 | Karp et al. .................... 718/101 |

OTHER PUBLICATIONS

Bertino, et al., "Transaction Models and Architectures", Encyclopedia of Computer Science and Technology, vol. 38, 1997, 56 pages.
Unknown., "Transaction Monitor Resource Manager" IBM Open Blueprint, 1995-1996, 28 pages.
Paul, et al., "A Framework for Automatic Identification of the Best Checkpoint and Recovery Protocol", Proceedings of the 6th International Conference on Distributed Computing IWDC'04, Dec. 27-30, 2004, 1 page.
Ferreira, et al., "Keeping Checkpoint/Restart Viable for Exascale Systems", Retrieved from http://prod.sandia.gov/techlib/access-control.cgi/2011/116815.pdf, Sep. 2011, 181 pages.

* cited by examiner

*Primary Examiner* — Charles E Anya
(74) *Attorney, Agent, or Firm* — Trop, Pruner & Hu, P.C.

(57) ABSTRACT

A technique for resending messages can include determining if a particular message with a first unique identifier has been received by a recipient task among a number of potential recipient tasks in a distributed streaming system, notifying the number of potential recipient tasks to ignore the particular message with the first unique identifier, and resending the particular message with a second unique identifier.

11 Claims, 4 Drawing Sheets

RESENDING MESSAGES

BACKGROUND

Data received from one or multiple sources can be communicated as a data stream. In some applications, it may be desirable to process the data stream in real-time. During communication of a data stream in real-time, communication may fail.

DETAILED DESCRIPTION

Figure 1:
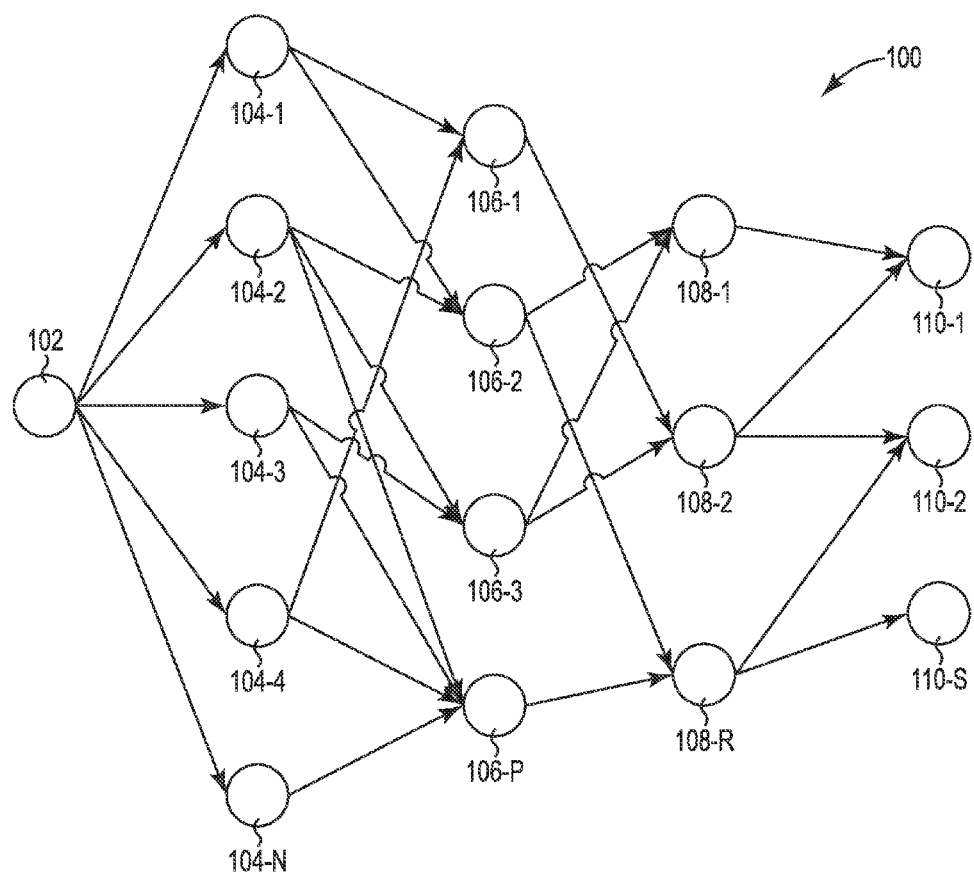
FIG. 1 is a diagram illustrating an example of a streaming system according to the present disclosure.

Due to the popularity of applications that process multiple pieces of data in real-time or near-real-time, use of streaming systems has increased. A streaming system can communicate data received from a number of data sources as a data stream (e.g., in a sequence of digitally encoded packets of data and/or information). In some examples, a streaming system can include a distributed streaming system which can perform parallel processing (e.g., perform processing of portions of a data stream simultaneously). The sequence and/or order of communicating the data stream from a particular source to a particular destination (e.g., the dataflow) can be represented as a graph structure having nodes and edges. A node can include an electronic device and/or computer readable instructions that are capable of sending, receiving and/or forwarding a data stream over a streaming system. Furthermore, an edge can include a path, route, and/or channel that connects a number of nodes. As used herein, "a number of" an element and/or feature can refer to one or more of such elements and/or features.

A streaming system can include a number of interconnected operations. Furthermore, an operation can include computer readable instructions that perform a particular function. For example, an operation can include computer readable instructions to "move object x" and/or "calculate the distance between objects x and y". The execution of an operation can be divided into a number of intervals (e.g., states) based on the messages that the operation receives. These states can include a deterministic sequence of sub-operations, started by the receipt of a particular message by the operation. As used herein, a message can include a number of bits of data.

In some examples, each of the interconnected operations can include a number of parallel instances (e.g., tasks). A task can receive input messages from an upstream task (e.g., a task upstream of the receiving task), derive new messages, and send the new messages to a downstream task (e.g., a number of tasks downstream of the receiving task). A task can include a source task and/or a target task. A source task can include a task that originates a data stream, and a target task can include a task that has subscribed to the data stream (e.g., is an intended recipient of the data stream from the source task). The number of tasks of each operation can vary based on computing demand (e.g., an elastic dataflow).

In a streaming system, parallel and distributed tasks can be executed one after the other (e.g., chained transactional tasks). In other words, chained transactional tasks can include a linear succession of tasks that are to be executed sequentially. In such examples, a subsequent task in the dataflow will be executed if and only if the previous task was completed successfully. Some transactional dataflows (e.g., dataflows representing chained transactional tasks) require every task to save a record of its state as well as a list of its input and/or output messages at a particular time point (e.g., create a checkpoint) in order to restore the operation to the last checkpointed state. Restoring the operation to the last checkpointed state can enable processing of missing messages.

It is desirable in a transactional dataflow that messages are processed in the order of generation (e.g., in the order of sending from a source task) and that each message is processed once and only once (e.g., herein referred to as the "once and only once" semantics). Furthermore, when a task fails (e.g., fails to send and/or is not processed), recovery of the failed task must ensure the missing output messages are resent without violating the once and only once semantics. When the messaging channel (e.g., a path and/or route from a source task to a target task) from a source task to a target task is known to the source task before sending a message, the message can be resent following failure without violating the once and only once semantics because the message can be identified by a message identifier (e.g., a particular numeric and/or alphanumeric sequence, herein referred to as a "message ID") and the target task can ignore duplicate messages based on the message ID. However, when the messaging channel is determined by a router component (e.g., a device and/or computer readable instructions for distributing messages to a task), the source task is unaware of which target task is to receive the message before sending the message and therefore the routing information is not checkpointed for resending the message upon failure recovery. In such instances, the router component may resend the message to a different recipient task, which may result in duplicate processing of the same message.

In contrast, in accordance with a number of examples of the present disclosure, a two phased protocol can be used to make a decision on whether to invalidate a previously sent message and re-send it again with a different unique identifier. This two phase protocol—a kind of compensation process—allows for messages to be sent to a recipient task once and only once, and also allows for messages to be resent following a message failure. Furthermore, the two phase protocol, as described further herein, allows messages to be resent without violating the once and only once semantics, while maintaining the flexibility and efficiency of a parallel and distributed streaming system using a router component.

FIG. 1 is a diagram illustrating an example of a streaming system 100 according to the present disclosure. As mentioned herein, streaming system 100 can include a parallel, distributed, and/or elastic dataflow process. Furthermore, streaming system 100 can include a number of interconnected operations. Each of the number of interconnected operations can include a number of tasks (e.g., task 102, task 104-1, task 104-2, task 104-3, task 104-4, task 104-N, task 106-1, task 106-2, task 106-3, task 106-P, task 108-1, task 108-2, task 108-R, task 110-1, task 110-2, and task 110-S, herein referred to generally as tasks 102, 104, 106, 108, and 110, respectfully). For instance, task 104-1, task 106-1, task 108-1, and task 110-1 can include a first operation. In another instance, task 104-2, task 106-3, task 108-2, and task 110-1 can include a second operation. In some examples, tasks 102, tasks 104, tasks 106, tasks 108, and tasks 110 can include machine readable instructions that execute on a processor to perform a particular function, such as a particular arithmetic function.

In a number of examples, a streaming system 100 can include a source task (e.g., 102) and a target task (e.g., 110). A source task can include a task upstream from a target task, and can send a number of messages to a target task. For example, source task 102 can send a number of messages to target tasks 110. Although FIG. 1 displays a single source task 102 and a plurality of target tasks 110, streaming system 100 can include a number of source tasks 102 and/or a number of target tasks 110. A source task can receive messages from various data sources. For example, a data source can include a sensor, a mobile device, a social networking data source, and/or a data source in an enterprise (e.g., such as a business concern, educational organization, government agency, etc.) among other data sources. In some examples, a source task 102 can be a data source.

A number of messages can be sent to a number of tasks within streaming system 100. In some examples, the number of tasks can include sending tasks and recipient tasks. A sending task can be a task upstream from a recipient task that sends a number of messages to the downstream recipient task. Similarly, a recipient task can be a task downstream from the sending task and can receive a number of messages from the upstream sending task. In some examples, a sending task can be a source task and a recipient task can be a target task. For example, a source task can send a number of messages to a number of recipient tasks, and the number of recipient tasks can send the number of messages to a number of recipient tasks. For instance, source task 102 can send a number of messages to task 104 (e.g., recipient tasks). In this instance, task 104 can subsequently send the number of messages to task 106 (e.g., recipient tasks). Each of the number of messages can include a header portion and a payload portion, wherein the payload portion includes data and the header portion includes control information (e.g., information relating to a communications protocol and/or address information for routing the messages).

Streaming system 100 can use a number of different methods to send messages from a source task to a target task. For example, target tasks may subscribe to the output of source tasks by shuffle-grouping (e.g., by load-balance oriented selection), field-grouping (e.g., by hash partition), and/or by random grouping (e.g., by random selection). Load-balance oriented selection can include distributing messages across a number of computing devices, computer clusters, network links, central processing units, disk drives, and/or other resources to achieve optimal resource utilization and/or efficiency. Hash partitioning can include computing a value (e.g., a hash value) for each message to identify respective partitions for processing the respective message. Random grouping can include distributing messages in a random manner.

In a number of examples, streaming system 100 can include a transaction management system. A transaction management system can link a number of tasks (e.g., 104, 106, 108, and 110) into a single transaction, and can ensure that either all tasks in the transaction are completed without error or none of them are completed. That is, each transaction must succeed or fail as a complete unit. For example, a transaction involving moving $700 from a customer's savings account to a customer's checking account includes at least two tasks: debiting the savings account by $700 (e.g., task 104), and crediting the checking account by $700 (e.g., 106). A transaction management system can ensure that if one task succeeds (e.g., the $700 is debited from the customer's savings account) but the other does not (e.g., the checking account is not credited by $700), the transaction must fail (e.g., the $700 is not moved from the customer's savings account to the customer's checking account).

Figure 2:
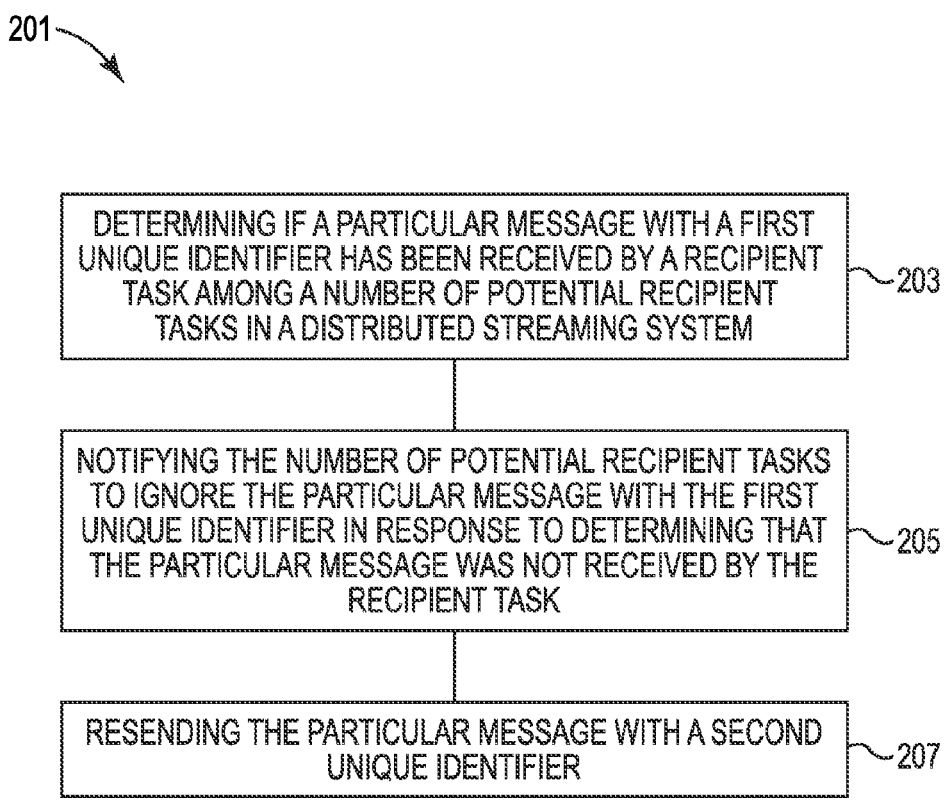
FIG. 2 is a flow chart illustrating an example of a method for resending messages according to the present disclosure.

FIG. 2 is a flow chart illustrating an example of a method 201 for resending messages according to the present disclosure. At 203, the method 201 can include determining if a particular message with a first unique identifier has been received by at least one recipient task among a number of potential recipient tasks in a distributed streaming system. As used herein, a potential recipient task can include all of the recipient tasks that are downstream from a sending task. A unique identifier can include a message ID and/or other mechanism for identifying a particular message. In a number of examples, messages sent from a particular task can be assigned incremental and task specific unique identifiers. For instance, a first particular message with a first message ID sent from task 104 can be assigned message ID 123456 and a second particular message with a first message ID sent from task 104 can be assigned message ID 123457. In a number of examples, each task (e.g., 104, . . . , 110) can maintain a list of message IDs received.

A source task (e.g., 102) can send an inquiry to a number of potential recipient tasks (e.g., 104, 106, 108, and 110) and ask if any of the potential recipient tasks received a particular message with the first unique identifier (e.g., a first message ID), such as 123456. An inquiry can include a request for a list of all unique identifiers received by the potential recipient tasks over a period of time and/or a request whether a message with a particular unique identifier was received by the potential recipient tasks.

At 205, the method 201 can include notifying the number of potential recipient tasks to ignore the particular message with the first unique identifier in response to determining that the particular message was not received by the at least one recipient task. For instance, a particular task (e.g., 104) can send a particular message with a message ID 123456 to a number of recipient tasks (e.g., 106), but the particular message may get stuck in the buffer queue of the number of recipient tasks and never actually be received by the number of recipient tasks. A buffer queue can include a region of physical memory storage used to temporarily store data and/or messages while they are being moved from one place to another. In another example, the sending task (e.g., 104) may fail and never actually send the message to the number of recipient tasks (e.g., 106). In either scenario, upon determining that none of the potential recipient tasks received the particular message with message ID 123456, the sending task (e.g., 104) may notify each of the potential recipient tasks (e.g., 104, 106, 108, 110) to ignore a message with message ID 123456. The sending task may notify each of the potential recipient tasks by sending a particular message including the message ID and instructions not to process the data associated with that message ID.

At 207, the method 201 can include resending the particular message with a second unique identifier. For instance, if task 104 sent a particular message with a message ID 123456, task 104 can resend the particular message with a second message ID 987654. In some examples, the second unique identifier can include an advanced message ID. For example, the second unique identifier can include a particular numerical and/or alphanumerical character that identifies it as a resent message. However, examples are not so limited, and the second unique identifier can include a new incremental and task specific unique identifier.

Figure 3:
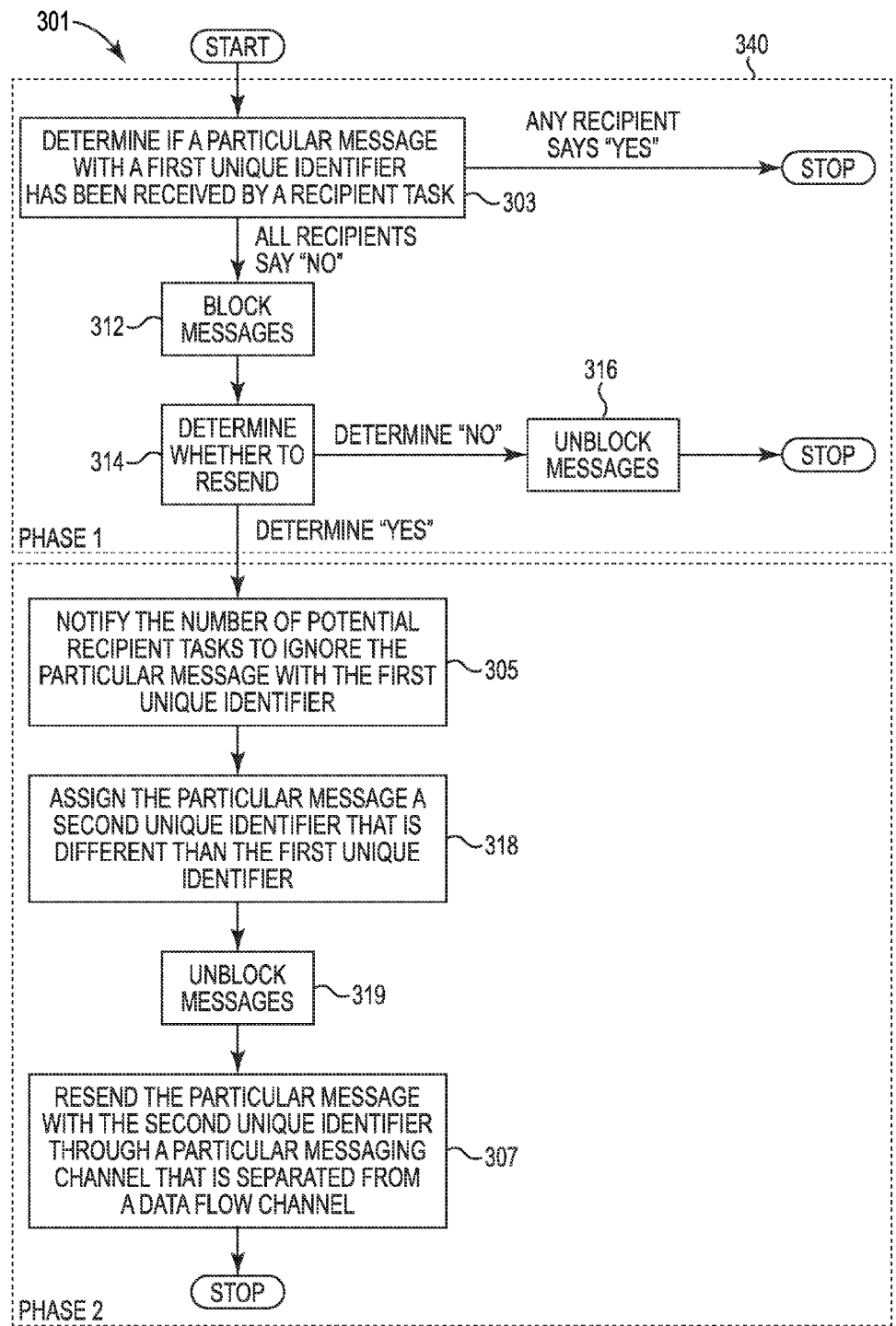
FIG. 3 is a flow chart illustrating an example of a method for resending messages according to the present disclosure.

FIG. 3 is a flow diagram of a method 301 of resending messages according to the present disclosure. In a number of examples, the method 301 can include a two-phase protocol. As discussed further herein, phase 1 (e.g., 340) of the protocol can include a number of deciding and determining instructions, and phase 2 (e.g., 342) of the protocol can include a number of resending instructions.

At 303, the method 301 can begin with phase 1 (e.g., 340) and can include determining if a particular message with a first unique identifier has been received by at least one recipient task among a number of potential recipient tasks in a distributed streaming system. Determining if a particular message has been received can include a source task sending an inquiry message to a number of potential recipient tasks and asking if any of the potential recipient tasks received the particular message. If any of the potential recipient tasks respond that it received the particular message, the method 301 stops. If, however, all of the potential recipient tasks respond that they did not receive the particular message, the method 301 continues to 312.

At 312, the potential recipient tasks can be blocked from receiving new messages. The potential recipient tasks can be blocked from receiving new messages by receiving a particular message from the source task indicating that no new messages should be processed until further notice is received.

At 314, the source task may determine whether to resend the particular message to a number of recipient tasks. In some instances, the source task may determine at 314 not to resend the particular message. In this instance, the potential recipient tasks can again resume receiving new messages at 316, and the method 301 stops.

In some examples, the source task may determine to resend the particular message. The source task may determine to resend the particular message to the same recipient tasks as the first sent message. However, examples are not so limited and the source task may determine to resend the particular message to different and/or additional recipient tasks as the first sent message.

At 305, the method 301 can continue with phase 2 (e.g., 342). At 305, the source task may notify the number of potential recipient tasks to ignore the particular message with the first unique identifier. Furthermore, at 318, the source task may assign the particular message a second unique identifier that is different than the first unique identifier. After assigning a second unique identifier to the particular message, the potential recipient tasks can again resume receiving new messages at 319.

At 307, the source task may resend the particular message with the second unique identifier through a particular messaging channel that is separated from the dataflow channel. For example, if the particular message was first sent through the dataflow channel with a unique identifier of ABCD123, the particular message can be resent through a different messaging channel with a unique identifier of BDFG567.

Figure 4:
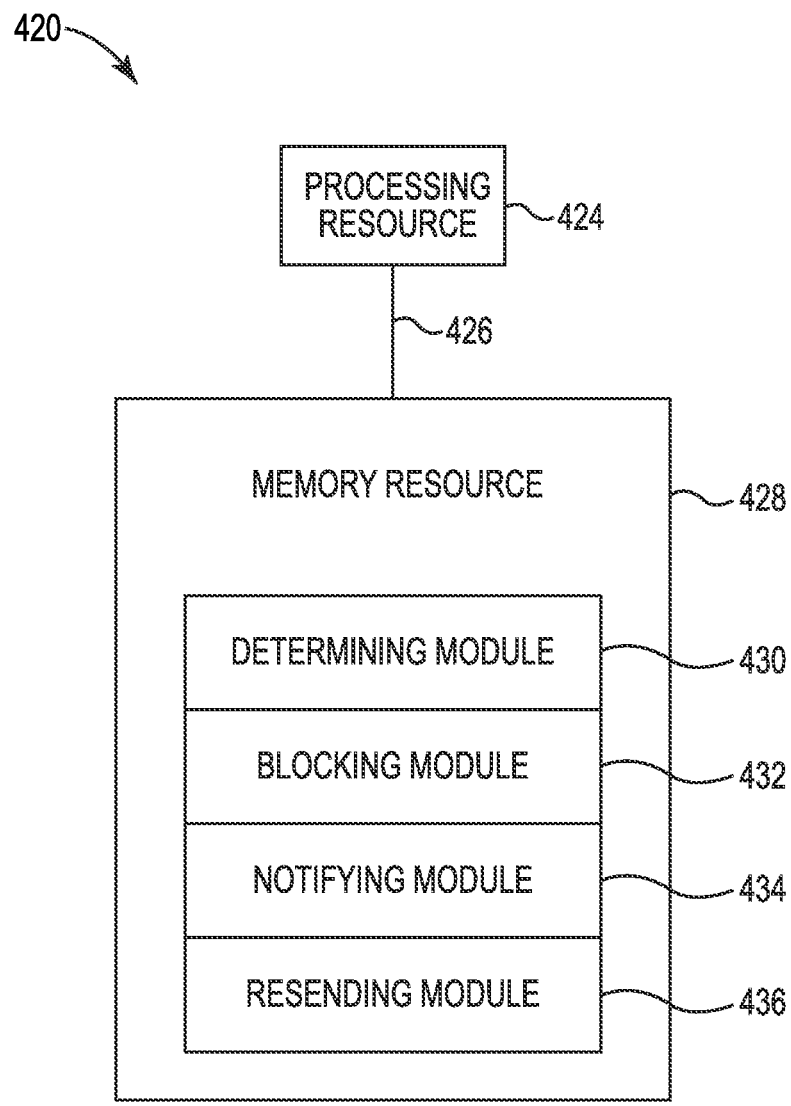
FIG. 4 is a diagram illustrating an example of a system according to the present disclosure.

FIG. 4 illustrates an example of a system 420 according to the present disclosure. The system 420 can use software, hardware, firmware, and/or logic to perform a number of functions.

The system 420 can be any combination of hardware and program instructions configured to resend messages. The hardware, for example can include a processing resource 424 and/or a memory resource 428 (e.g., computer-readable medium (CRM), machine readable medium (MRM), database, etc.). A processing resource 424, as used herein, can include any number of processors capable of executing instructions stored by a memory resource 428. Processing resource 424 may be integrated in a single device or distributed across devices. The program instructions (e.g., computer-readable instructions (CRI)) can include instructions stored on the memory resource 428 and executable by the processing resource 424 to implement a desired function (e.g., determining if a particular message with a first unique identifier has been received by at least one recipient task among a number of potential recipient tasks in a distributed streaming system, etc.).

The memory resource 428 can be in communication with a processing resource 424. A memory resource 428, as used herein, can include any number of memory components capable of storing instructions that can be executed by processing resource 424. Such memory resource 428 can be a non-transitory CRM. Memory resource 428 may be integrated in a single device or distributed across devices. Further, memory resource 428 may be fully or partially integrated in the same device as processing resource 424 or it may be separate but accessible to that device and processing resource 424. Thus, it is noted that the system 420 may be implemented on a user and/or a client device, on a server device and/or a collection of server devices, and/or on a combination of the user device and the server device and/or devices.

The processing resource 424 can be in communication with a memory resource 428 storing a set of CRI executable by the processing resource 424, as described herein. The CRI can also be stored in remote memory managed by a server and represent an installation package that can be downloaded, installed, and executed. The system 420 can include memory resource 428, and the processing resource 424 can be coupled to the memory resource 428.

Processing resource 424 can execute CRI that can be stored on an internal or external memory resource 428. The processing resource 424 can execute CRI to perform various functions, including the functions described with respect to FIGS. 1-3. For example, the processing resource 424 can execute CRI to resend a particular message with a second unique identifier.

The CRI can include a number of modules 430, 432, 434, 436. The number of modules 430, 432, 434, 436 can include CRI that when executed by the processing resource 424 can perform a number of functions. In a number of examples, the number of modules 430, 432, 434, 436 can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The number of modules 430, 432, 434, 436 can be sub-modules of other modules. For example, the determining module 430 and the blocking module 432 can be sub-modules and/or contained within the same computing device. In another example, the number of modules 430, 432, 434, 436 can comprise individual modules at separate and distinct locations (e.g., CRM, etc.).

A determining module 430 can include CRI that when executed by the processing resource 424 can provide a number of functions. The determining module 430 can determine if a particular message with a first unique identifier has been received through a dataflow channel by at least one recipient task among a number of potential recipient tasks in a distributed streaming system.

A blocking module 432 can include CRI that when executed by the processing resource 424 can perform a number of blocking functions. For example, the blocking module 432 can block the potential recipient tasks from receiving new messages upon determining that a particular message was not received by at least one recipient task.

A notifying module 434 can include CRI that when executed by the processing resource 424 can perform a number of notifying functions. For example, the notifying module 434 can notify the number of potential recipients to ignore a particular message with a first unique identifier.

A resending module 436 can include CRI that when executed by the processing resource 424 can perform a number of resending functions. For example, the resending module 436 can resend a particular message with a second unique identifier through a particular messaging channel that is different than the dataflow channel.

In some examples, the number of modules can include an assigning module. The assigning module (not shown in FIG. 4) can include CRI that when executed by the processing resource 424 can perform a number of assigning functions. The assigning module can assign a particular message a second unique identifier, wherein the second unique identifier is a task specific unique identifier. In some examples, the assigning module can assign a second unique identifier to the particular message in response to identifying that the particular message was not received by at least one recipient task.

A memory resource 428, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 428 can be integral, or communicatively coupled, to a computing device, in a wired and/or a wireless manner. For example, the memory resource 428 can be an internal memory, a portable memory, a portable disk, or a memory associated with another computing resource (e.g., enabling CRIs to be transferred and/or executed across a network such as the Internet).

The memory resource 428 can be in communication with the processing resource 424 via a communication path 426. The communication path 426 can be local or remote to a machine (e.g., a computing device) associated with the processing resource 424. Examples of a local communication path 426 can include an electronic bus internal to a machine (e.g., a computing device) where the memory resource 428 is one of volatile, non-volatile, fixed, and/or removable storage medium in communication with the processing resource 424 via the electronic bus.

The communication path 426 can be such that the memory resource 428 is remote from the processing resource (e.g., 424), such as in a network connection between the memory resource 428 and the processing resource (e.g., 424). That is, the communication path 426 can be a network connection. Examples of such a network connection can include a local area network (LAN), wide area network (WAN), personal area network (PAN), and the Internet, among others. In such examples, the memory resource 428 can be associated with a first computing device and the processing resource 424 can be associated with a second computing device (e.g., a Java® server).

For example, a processing resource 424 can be in communication with a memory resource 428, wherein the memory resource 428 includes a set of instructions and wherein the processing resource 424 is designed to carry out the set of instructions.

In a number of examples, system 420 can include number of engines. Each of the engines can include hardware that can be designated or designed to execute a particular module (e.g., modules 430, 432, 434, and 436). In some examples, the number of engines can include hardware and/or a combination of hardware and CRI. For instance, the instructions may be CRI stored on a tangible, non-transitory machine readable medium (e.g., memory resource 428) and the hardware may include a processing resource (e.g., 424) for executing those instructions. The processing resource can include one or multiple processors. Such multiple processors may be integrated in a single device or distributed across devices. Furthermore, the machine readable medium may be integrated in the same device as the processing resource or it may be separate and accessible to that device and the processing resource.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designators "N", "P", "R", and "S" particularly with respect to reference numerals in the drawings, indicate that a number of the particular feature so designated can be included with a number of examples of the present disclosure.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for resending messages comprising:
   determining if a particular message with a first unique identifier has been received by a number of potential recipient tasks in a distributed streaming system;
   in response to all of the number of potential recipient tasks not receiving the particular message, blocking the particular message;
   determining whether to resend the particular message;
   in response to determining to resend the particular message, notifying the number of potential recipient tasks to ignore the particular message with the first unique identifier;
   unblocking the particular message; and
   resending the particular message with a second unique identifier.

2. The method of claim 1, wherein the distributed streaming system is a transactional dataflow system.

3. The method of claim 2, wherein the transactional dataflow includes a number of interconnected operations.

4. The method of claim 1, wherein the first unique identifier and the second unique identifier are task specific message identifiers.

5. A non-transitory computer-readable medium storing a set of instructions executable by a processing resource to cause a computer to:
implement a first phase in a two phase protocol, wherein the first phase includes instructions to:
determine if a particular message with a first unique identifier has been received by a number of potential recipient tasks in a distributed streaming system; and
implement a second phase in the two phase protocol, wherein the second phase includes instructions to:
determine whether to resend the particular message;
in response to determining to resend the particular message, notify the number of potential recipient tasks to ignore the particular message with the first unique identifier;
unblock the particular message;
assign the particular message a second unique identifier that is different than the first unique identifier; and
resend the particular message with the second unique identifier.

6. The non-transitory computer-readable medium of claim 5, wherein the second unique identifier includes a particular character that identifies the particular message as a resent message.

7. The non-transitory computer-readable medium of claim 5, wherein the set of instructions executable by the processing resource includes instructions to resend the particular message to a number of different recipient tasks.

8. A system for resending messages, the system comprising:
a processing resource comprising at least one hardware processor;
a memory resource coupled to the at least one hardware processor to implement:
a determining module to determine if a particular message with a first unique identifier has been received through a dataflow channel by a number of potential recipient tasks in a distributed streaming system;
a blocking module to block the particular message in response to all of the number of potential recipient tasks not receiving the particular message;
a notifying module to determine whether to resend the particular message and in response to determining to resend the particular message, notify the number of potential recipient tasks to ignore the particular message with the first unique identifier;
an unblocking module to unblock the particular message; and
a resending module to resend the particular message with a second unique identifier through a particular messaging channel that is different than the dataflow channel.

9. The system of claim 8, wherein the notifying module includes instructions to send notice to the number of potential recipient tasks including a message identifier (ID) and instructions not to process data associated with that message ID.

10. The system of claim 8, wherein the distributed streaming system is a transactional dataflow system.

11. The system of claim 8, further comprising an assigning module to assign the particular message the second unique identifier, wherein the second unique identifier is a task specific unique identifier.

* * * * *